April 8, 1969 L. C. RAZAITIS ET AL 3,437,833

SIGNAL PULSE SHAPER

Filed May 18, 1964 Sheet 1 of 2

INVENTOR.
JOHN D. MENG
JOHN R. NOWELL
LEO C. RAZAITIS

Louis P. Elbinger

INVENTOR.
JOHN D. MENG
JOHN R. NOWELL
LEO C. RAZAITIS
BY

United States Patent Office 3,437,833

Patented Apr. 8, 1969

3,437,833

SIGNAL PULSE SHAPER

Leo C. Razaitis, Windsor, Conn., John D. Meng, Milpitas, Calif., and John R. Nowell, Phoenix, Ariz., assignors to General Electric Company, a corporation of New York Filed May 18, 1964, Ser. No. 368,195
Int. Cl. H03k 5/20
U.S. Cl. 307—231 7 Claims This invention relates to pulse shaper circuits and more particularly to shaper circuits which are especially suited to reshape electrical signals generated in tape handlers employed in data processing systems by transforming variously shaped pulses into rectangular pulses whose leading edges occur at the instant the original pulses pass through their respective maximum or minimum values.

Magnetic tape is widely used for storing information in high speed electronic data processing systems. The tape is usually carried on two storage reels: a supply reel and a take-up reel. As the tape is transferred from supply reel to take-up reel, it moves against one or more magnetic tape heads which can either "read" stored information from the tape or can "write" information on the tape for storage. In other systems, information is stored in a similar manner on a revolving drum having a magnetic material deposited upon the surface.

Digital information may be stored on magnetic tape or magnetic drums in the form of magnetic polarity reversals. In sensing these reversals, pulses are generated by the magnetic tape head. In the high density recording used in present day equipment, information read from the tape or drums may generate signal pulses with variously distorted waveforms and with large variations in amplitude. To correct the distortion of these generated pulses, shaper circuits have been developed which respond to peak values of signals and which convert the distorted waveforms into rectangular pulses.

However, these prior art shaper circuits are sensitive to noise pulses and to false voltages which develop due to changes in the pressure which moving magnetic tape exerts against the magnetic tape head. Noise pulses often have a large amplitude but are of shorter time duration than the signal pulses. Since prior art shaper circuits are sensitive to changes in input signal amplitude, such noise pulses produce false signals at the shaper output terminal. As the magnetic tape moves against the magnetic tape head, variations in pressure of tape against the magnetic tape head may result in a change of input voltage amplitude. This change in amplitude also produces false signals at the shaper output terminal, although the change has a long time duration compared to the duration of a pulse which represents digital information.

Accordingly, shaper circuits are needed which will not respond to relatively short duration noise pulses or to relatively long duration voltage variations.

It is, therefore, the principal object of the present invention to provide an improved signal pulse shaper.

Another object of this invention is to provide an improved signal pulse shaper circuit which is substantially unaffected by noise pulses.

Another object of this invention is to provide an improved signal shaper circuit which is substantially unaffected by slow variations in input voltage amplitude.

The foregoing objects are achieved by providing a circuit which receives signals from a magnetic tape head. These signals are rectified by a full-wave rectifier which provides two different signals at its two output terminals. The signal at one output terminal comprises unidirectional pulses having a positive polarity. The signal at the other output terminal comprises unidirectional pulses having a negative polarity.

The pulses having a negative polarity are amplified and are applied to the input terminal of a detector. These pulses cause the detector to develop a signal only when the applied pulses have a sufficient change in voltage per unit of time and sufficient time duration.

The pulses having a positive polarity are applied to the input terminal of an amplitude detector. These pulses cause the amplitude detector to develop a signal only when the applied pulses have sufficient amplitude. The signals developed by the two detectors are applied to a coincidence gate which produces a signal pulse only when both detectors develop signals.

The signal pulses from the coincidence gate are applied to a pulse stretcher. The pulse stretcher develops rectangular pulses having a minimum time duration in response to pulses having varying time durations.

Other objects and advantages of the invention will become apparent from the following detailed description when taken in connection with the accompanying drawings, wherein:

FIG. 3 is a circuit diagram of one embodiment of the present invention.

Figure 1:
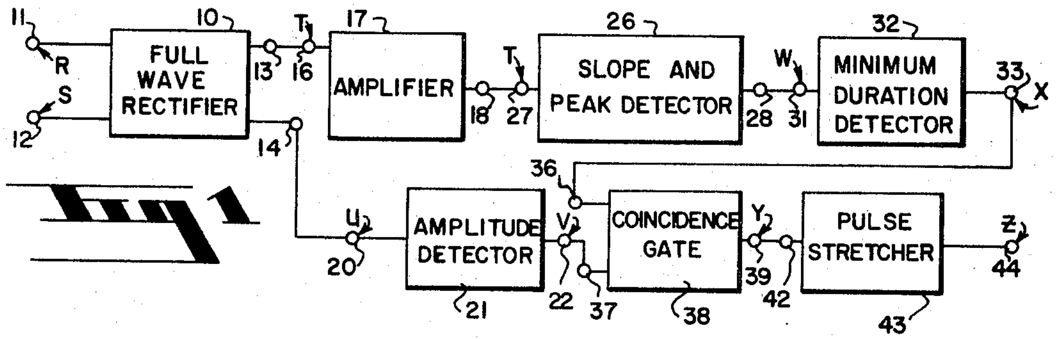
FIG. 1 is a block diagram of the present invention.

The signal shaper of FIG. 1 comprises a full-wave rectifier, an amplifier, three detectors, a coincidence gate and a pulse stretcher. The shaper receives variously shaped pulses and transforms them into rectangular pulses. A full-wave rectifier 10 is connected to a pair of signal-input terminals 11 and 12 for receiving pulses generated by a magnetic tape head. The full-wave rectifier is a circuit having two signal-input terminals and two signal-output terminals. The rectifier receives signals having both positive and negative voltage polarities and converts these to unidirectional signal pulses. When the signal from a magnetic tape head is applied to the signal-input terminals, the voltage waveform delivered at one signal-output terminal comprises a series of positive pulses and the voltage waveform delivered at the other signal-output terminal comprises a series of negative pulses. The voltage waveform delivered at one signal-output terminal is the inverted version of the voltage waveform delivered at the other signal-output terminal.

Rectifier 10 delivers pulses at a first signal-output terminal 13 and a second signal-output terminal 14. Terminal 13 is coupled to an input terminal 16 of an amplifier 17. Amplifier 17 has an output terminal 18. Terminal 14 is coupled to an input terminal 20 of an amplitude detector 21. An amplitude detector circuit, of the type used herein, produces a predetermined positive voltage at an output terminal 22 when no signal is applied to the input terminal. When the signal applied to the input terminal exceeds a predetermined threshold voltage, the detector produces a zero value of voltage at the output terminal.

A slope and peak detector 26 produces a rectangularly shaped voltage pulse at an output terminal 28 when the electrical wave shape of a signal applied to an input terminal 27 has a given slope. Terminal 27 is connected to terminal 18 to receive the output signal of amplifier 17. Terminal 28 is connected to an input terminal 31 of a minimum duration detector 32. Detector 32 has an output terminal 33. A minimum duration detector, of the type used herein, accurately times the duration of a pulse applied to the input terminal and delivers a signal at the output terminal. When the duration of the pulse applied to the input terminal is less than a predetermined value, the signal at the output terminal is more positive than a predetermined voltage value. When the duration of the pulse applied to the input terminal is greater than a predetermined value, the signal at the output terminal is fixed at the predetermined voltage value.

Detector 32 and detector 21 respectively deliver signal pulses to a first input terminal 36 and a second input terminal 37 of a coincidence gate 38. Gate 38 has an output temrinal 39. A coincidence gate circuit, of the type used herein, produces a predetermined positive voltage at the output terminal when a signal applied to the first input terminal and a signal applied to the second input terminal are each less positive than a predetermined threshold voltage. When either of the signals applied to the first and second input terminals is more positive than a predetermined threshold voltage, the coincidence gate produces a zero value of voltage at the output terminal.

Therefore, gate 38 delivers positive voltage pulses at output terminal 39 when signals applied to terminals 36 and 37 are of the proper amplitude. The pulses at terminal 39 may be of short duration. Terminal 39 of gate 38 is connected to an input terminal 42 of a pulse stretcher 43. Pulse stretcher 43 has an output terminal 44. A pulse stretcher circuit, of the type used herein, delivers a pulse having a predetermined minimum time duration at its output terminal when a rapidly decreasing voltage is applied to the input terminal.

Figure 2:
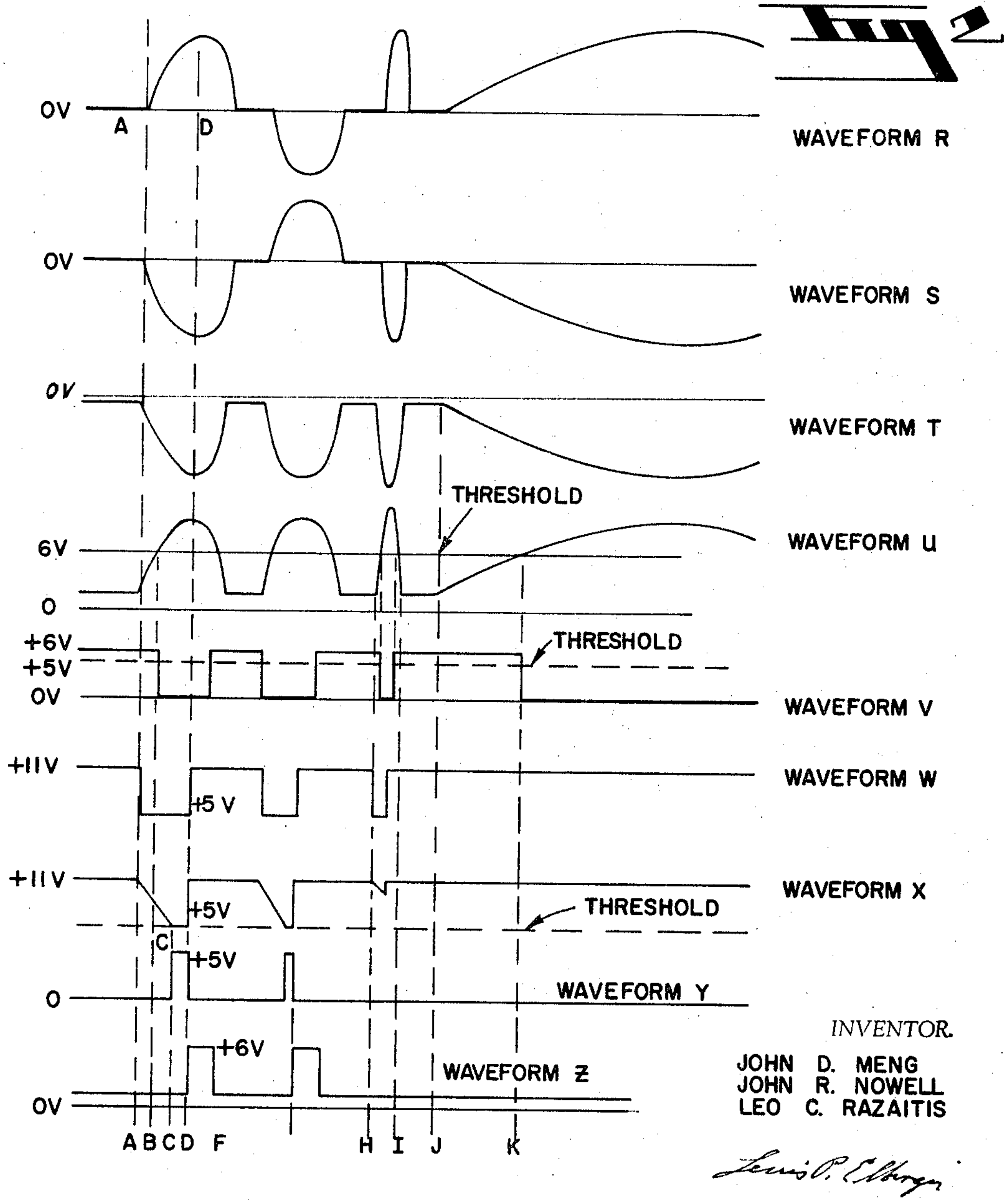
FIG. 2 illustrates waveforms useful in explaining the operation of the instant invention.
Figure 2:
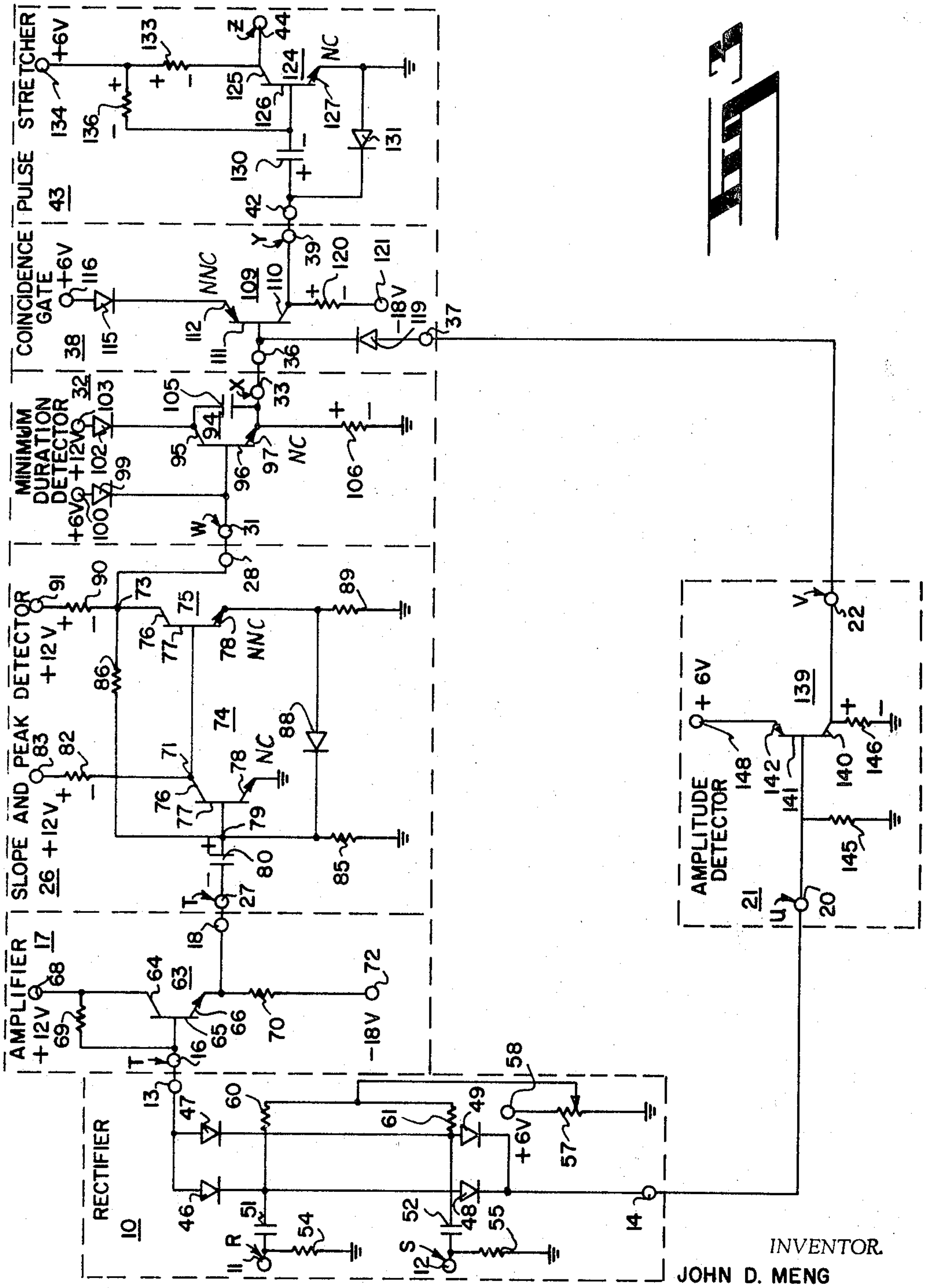

The typical voltages of terminals 11, 12, 16, 20, 22, 31, 33, 39 and 44 are shown respectively in the waveforms R, S, T, U, V, W, X, Y and Z of FIG. 2.

The operation of the signal pulse shaper of FIG. 1 will now be described with reference to the waveforms shown in FIG. 2. Typical voltages at the output terminals of a magnetic tape head produce signals having the voltage versus time waveforms shown in waveforms R and S. The signal shown in waveform R is received by terminal 11. The signal shown in waveform S is received by terminal 12. The signal between terminal 11 and terminal 12 is rectified by rectifier 10. A rectified signal having the voltage shown in waveform T is delivered to terminal 16 of amplifier 17. A signal having the voltage shown in waveform T is also delivered to terminal 27 of detector 26. A rectified signal having the voltage shown in waveform U is delivered at terminal 20 of detector 21.

Prior to time A (FIG. 2) the voltage at terminals 11 and 12 causes the shaper of FIG. 1 to deliver a near zero value of voltage at output terminal 44.

At time A (waveform T, FIG. 2) the negative slope of the voltage applied to terminal 27 causes detector 26 to deliver a relatively negative voltage at terminal 28 and at terminal 31 of detector 32. The slope of a voltage is defined as the change in volts per unit of time. The negative voltage at terminal 31 of detector 32 causes detector 32 to start timing the duration of the applied pulse. The voltage at terminal 33 of detector 32 starts to decrease from the maximum positive value toward a minimum value as shown in waveform X.

At time B (waveform U) the voltage at terminal 20 of detector 21 reaches a predetermined threshold voltage. This threshold voltage is the minimum voltage required on terminal 20 to cause detector 21 to provide a zero value of voltage at terminal 22.

At time C the voltage at terminal 36 (waveform X) and the voltage at terminal 37 (waveform V) both become less positive than the threshold voltage for gate 38 so that gate 38 produces a positive voltage at terminal 39, as shown in waveform Y.

At time D (waveform T, FIG. 2) the slope of the voltage at terminal 27 of detector 26 has increased to that detector 26 again delivers a voltage at terminal 28 having the same positive voltage value that was delivered prior to time A. This causes detector 32 to deliver the same positive voltage at terminals 33 and 36 that was delivered prior to time A. Inasmuch as the voltage at terminal 36 of gate 38 is now more positive than the threshold voltage required for gate 38 to deliver a positive voltage at terminal 39, the voltage at terminal 39 decreases rapidly to a zero value of voltage as shown in waveform Y. This rapid decrease in voltage potential at terminals 39 and 42 causes pulse stretcher 43 to develop a positive voltage pulse having a predetermined minimum time duration as shown in waveform Z, between time D and time F. By proper choice of components, point D can be chosen to be at the peak of waveform T, or point D can be chosen to be slightly ahead of the peak or slightly after the peak of waveform T.

Thus, it can be seen that the instant invention transforms a rounded pulse of waveform R into a rectangular pulse whose leading edge occurs at the instant the original pulse passes through a predetermined point near its maximum.

At time H (waveform T) a noise pulse applied to terminal 27 of detector 26 causes the detector to deliver a pulse at terminals 28 and 31. The pulse at terminal 31 causes detector 32 to deliver a pulse having a decreasing voltage at terminals 33 and 36. Inasmuch as the time duration of the noise pulse is shorter than a predetermined minimum duration, the voltage potential at terminal 36 of gate 38 does not decrease to the threshold voltage shown in waveform X. Thus, gate 38 does not produce an output pulse at terminals 39 and 42, and no pulse is delivered to terminal 44. Thus, it can be seen that noise pulses having less than a predetermined duration do not cause a signal pulse to be delivered at output terminal 44.

At time J (waveform T) a slowly increasing voltage potential is applied to terminals 11 and 12. The slope of the applied voltage waveform is too small to cause detector 26 to deliver a pulse at terminal 28. Inasmuch as no pulse is delivered at terminal 31, no pulse will be delivered at terminal 39 of gate 38 or at output terminal 44 of pulse stretcher 43. Thus, it can be seen that a slowly varying voltage at terminal 11 does not cause a signal pulse to be delivered at output terminal 44.

If the amplitude of a signal pulse at terminal 20 of amplitude detector 21 is less than the threshold voltage shown in waveform U, detector 21 will not produce a zero value of voltage at terminals 22 and 37. Gate 38 will not deliver a positive voltage pulse at terminal 39 and pulse stretcher 43 will not deliver a pulse at terminal 44. Thus, signal pulses having less than a predetermined voltage amplitude will not cause the signal pulse detector of FIG. 1 to deliver an output pulse.

Thus, it can be seen that the novel arrangement of a slope and peak detector, a minimum duration detector, an amplitude detector, a rectifier, a gate, an amplifier and a pulse stretcher employed in FIG. 1 detects signals having greater than a predetermined minimum slope, minimum time duration and minimum amplitude.

FIG. 3 illustrates a circuit embodiment of the invention of FIG. 1. Rectifier 10 comprises four diodes 46–49 connected in a full-wave rectified configuration to deliver negative voltage pulses to terminal 13 and positive voltage pulses to terminal 14. A potentiometer 57 supplies a reference voltage potential to each of the diodes in the rectifier circuit. One terminal of potentiometer 57 is connected to a terminal 58 which is connected to a suitable positive potential such as +6 volts. The other terminal of potentiometer 57 is connected to a source of reference potential such as ground.

Amplifier 17 increases the amplitude of the pulses supplied to terminal 13 and delivers these larger pulses to terminal 18.

Detector 26 senses the slope of negative voltage pulses applied to input terminal 27 and senses the time that each of these pulses reaches its peak negative voltage potential. Detector 26 comprises a pair of transistors 74 and 75, each having a collector 76, a base 77 and an emitter 78. A capacitor 80 couples the voltage pulses from terminal 27 to base 77 of transistor 74. Terminal 27 is connected to terminal 18 of amplifier 17. A resistor 82 is connected between collector 76 of transistor 74 and a terminal 83 which is connected to a suitable positive potential such as +12 volts. A resistor 85 is connected between base 77 of transistor 74 and a source of reference potential such as ground. Emitter 78 of transistor 74 is connected to a source of reference potential such as ground. A resistor 86 is connected between collector 76 of transistor 75 and base 77 of transistor 74 to provide bias current for transistor 74. A diode 88 is connected between emitter 78 of transistor 75 and base 77 of transistor 74 to provide base current when signal voltage at terminal 27 decreases toward a maximum negative voltage potential. A resistor 89 is connected between emitter 78 of transistor 75 and a source of reference potential such as ground. Resistors 85, 86 and 89 and capacitor 80 function to differentiate the voltage pulse applied to terminal 27. By proper choice of these four components, detector 26 senses the time that each voltage pulse reaches its peak negative voltage potential. If the value of one or more of these components is changed, detector 26 senses a time slightly after each voltage pulse reaches its peak negative voltage potential. A resistor 90 is connected between collector 76 of transistor 75 and a terminal 91 which is connected to a suitable positive potential such as +12 volts. Terminal 28 is connected to collector 76 of transistor 75. Base 77 of transistor 75 is connected to collector 76 of transistor 74.

Detector 32 comprises a transistor 94 having a collector 95, a base 96 and an emitter 97 to sense the duration of signal pulses. Base 96 receives signal pulses applied to input terminal 31 which is connected to terminal 28 of detector 26. A clamping diode 99 is connected between base 96 and a terminal 100 which is connected to a suitable positive potential such as +6 volts. Diode 99 and the potential at terminal 100 limit the minimum positive potential at base 96. A diode 102 is connected between collector 95 and a terminal 103 which is connected to a suitable positive potential such as +12 volts. A capacitor 105 is connected between collector 95 and emitter 97, and a resistor 106 is connected between emitter 97 and ground. Capacitor 105 and resistor 106 are the most significant parameters which sense the duration of signal pulses. Emitter 97 is connected to output terminal 33.

Coincidence gate 38 comprises a transistor 109 having a collector 110, a base 111 and an emitter 112. Gate 38 produces a rectangular voltage pulse when a signal pulse having at least a minimum slope, a minimum time duration and a minimum amplitude is applied to the input terminals of the pulse shaper. Base 111 is connected to input terminal 36 which is connected to output terminal 33 of detector 32. A diode 115 is connected between emitter 112 and a terminal 116 which is connected to a suitable positive voltage such as +6 volts. A diode 119 is connected between base 111 and terminal 37 so that base 111 is effectively connected to terminal 37 only when the potential at terminal 37 is more positive than the potential at base 111. A resistor 120 is connected between collector 110 and a terminal 121 which is connected to a suitable negative potential such as —18 volts. Collector 110 is connected to output terminal 39.

Pulse stretcher 43 delivers a rectangular pulse having a predetermined minimum time duration at terminal 44 when a decreasing voltage potential is applied to terminal 42. Pulse stretcher 43 comprises a transistor 124, having a collector 125, a base 126 and an emitter 127. A capacitor 130 is connected between base 126 and input terminal 42. Terminal 42 is connected to output terminal 39 of gate 38. A clamping diode 131 is connected between terminal 42 and a source of reference potential such as ground. A resistor 133 is connected between collector 125 and a terminal 134 which is connected to a suitable positive potential such as +6 volts. Capacitor 130 and resistor 133 are the most significant parameters which determine the duration of the rectangular pulse delivered at terminal 44. A resistor 136 is connected between base 126 and terminal 134. Collector 125 is connected to output terminal 44.

Amplitude detector 21 senses signal pulses having at least a predetermined minimum voltage amplitude. When signal pulses having an amplitude of at least +5.5 volts are applied to terminal 20, detector 21 delivers a zero value of voltage at terminal 22. For all signals less positive than a +5.5 volts, detector 21 delivers approximately a +6 volt potential at terminal 22.

The operation of the circuit of FIG. 3, as presently understood, will now be described. Typical voltage signals received by input terminals 11 and 12 have the voltage versus time waveforms shown in waveforms R and S respectively. The signal between terminal 11 and terminal 12 is rectified by rectifier 10. A rectified signal having the voltage versus time waveform shown in waveform T is delivered at terminal 16 of amplifier 17. This signal is amplified and delivered at terminal 27 of detector 26. A rectified signal having the voltage versus time waveform shown in waveform U is delivered at terminal 20 of detector 21. Rectifier 10 and amplifier 17 are well-known in the prior art circuits.

Prior to time A (FIG. 2) the voltage potential at terminal 27 of detector 26 is a constant value. A current $I_1$ flows from terminal 91 through resistor 90 to junction point 73 where the current divides. A current $I_2$ flows from junction point 73 through resistor 86, through base 77 to emitter 78 of transistor 74 to ground. Current $I_2$ maintains transistor 74 conductive so that a current $I_3$ flows from terminal 83 through resistor 82, through collector 76 and emitter 78 of transistor 74 to ground. Current $I_3$ provides the voltage polarities shown across resistor 82. The value of the voltage at collector 76 is less than the value of the voltage at terminal 83 by the amount of the voltage drop across resistor 82 so that voltage at collector 76 of transistor 74 and base 77 of transistor 75 is near ground potential. This voltage potential at base 77 renders transistor 75 nonconductive.

At the same time, prior to time A, a current $I_4$ flows from junction point 73 to terminals 28 and 31, through base 96 to emitter 97 of transistor 94, and through resistor 106 to ground. This current maintains transistor 94 conductive. A current $I_5$ flows from terminal 103 through diode 102, collector 95 to emitter 97 and resistor 106 to ground. Currents $I_4$ and $I_5$ provide the voltage polarities shown across resistor 106. The voltage across resistor 106 is approximately 11 volts. This +11 volt potential at emitter 97 is coupled to base 111 of transistor 109 so that transistor 109 is rendered nonconductive.

At this time a current $I_7$ flows from ground through diode 131 and resistor 120 to terminal 121. Current $I_7$ provides the voltage polarities shown across resistor 120. The value of the voltage at terminal 39 is more positive than the value of the voltage at terminal 121 by the amount of the voltage drop across resistor 120 so that the voltage at terminals 39 and 42 is approximately at ground potential. A current $I_8$ flows from terminal 134 through resistor 136, through base 126 to collector 127 of transistor 124 to ground. Current $I_8$ maintains transistor 124 conductive. A current $I_9$ flows from terminal 134 through resistor 133, through collector 125 to emitter 127 to ground. Current $I_9$ provides the voltage polarities shown across resistor 133. This voltage drop across resistor 133 substracts from the voltage potential at terminal 134 so that the voltage at output terminal 44 is approximately at ground potential.

A this time, still prior to time A, in detector 21, a current $I_{11}$ flows from terminal 148 through emitter 142 to base 141, through resistor 145 to ground, thereby maintaining transistor 139 conductive. A current $I_{12}$ flows from terminal 148 through emitter 142 to collector 140, through resistor 146 to ground. Current $I_{12}$ provides the voltage polarities shown across resistor 146. The voltage at terminal 22 is approximately +6 volts. Prior to time A, transistor 74 is conducting (NC as shown in FIG. 3). Transistor 75 is not conducting (NNC in FIG. 3).

At time A the voltage at terminal 27 of detector 26 (waveform T, FIG. 2) changes in a negative direciton. This drop in voltage at terminal 27 causes a current $I_{2a}$ to flow from junction point 73 through resistor 86 to the right plate of capacitor 80, from the left plate of capacitor 80 to terminal 27. Current $I_{2a}$ charges capacitor 80 to a voltage substantially equal to the voltage applied to terminal 27. Current $I_{2a}$ produces a voltage drop across resistor 86. The voltage at base 77 of transistor 74 is now less positive than it was prior to time A. Thus, current $I_2$ which flows from base 77 to emitter 78 is less than the current $I_2$ prior to time A. A reduction in base-emitter current causes a reduction in collector to emitter current in transistor 74. The voltage drop across resistor 82 due to current $I_3$ will be reduced and the voltage at base 77 of transistor 75 will be more positive than prior to time A. Current $I_3$ flowing to junction point 71 now divides. A current $I_{14}$ now flows from junction point 71 through base 77 to emitter 78 of transistor 75, through resistor 89 to ground. Current $I_{14}$ maintains transistor 75 conductive. A current $I_{15}$ now flows from junction point 73 through collector 76 to emitter 78 of transistor 75, where the current divides. A current $I_{15a}$ flows from emitter 78 of transistor 75 through diode 88 and base 77 to emitter 78 of transistor 74 to ground. A current $I_{15b}$ flows from emitter 78 of transistor 75 through resistor 89 to ground.

Current $I_{15}$ is a relatively large current. This causes a substantial increase in $I_1$ through resistor 90. Thus, the voltage drop across resistor 90 increases. The voltage potential at junction point 73 and terminals 28 and 31 consequently decreases to approximately +5 volts (point A waveform W). Transistor 94 is rendered nonconductive as base 96 is less positive than emitter 97. Current $I_5$ now flows from terminal 103 through diode 102 to the upper plate of capacitor 105, from the lower plate of capacitor 105, through resistor 106 to ground. Current $I_5$ provides a charge on capacitor 105, capacitor 105 being substantially uncharged previously. Current $I_5$ maintains the voltage drop across resistor 106 so that transistor 109 remains nonconductive. As capacitor 105 charges, the voltage drop across resistor 106 decreases. The rate at which this voltage drop decreases is determined by the values of resistor 106 and capacitor 105. The rate of voltage drop determines the time between time A and time C (waveform X).

As time B approaches, transistors 74, 75, 124 and 139 are conductive. Transistors 94 and 109 are nonconductive. Capacitors 80 and 105 are being charged.

At time B the voltage potential at terminal 20 (waveform U) of detector 21 increases so that the voltage potential at base 141 of transistor 139 becomes substantially equal to the voltage potential at emitter 142. This event terminates current flow from emitter to base so that transistor 139 becomes nonconductive. No current now flows through resistor 146 so that the voltage at terminal 22 drops to ground potential (waveform V).

At time C, capacitor 105 of detector 32 has partially charged and current from terminal 103, through diode 102, capacitor 105 and resistor 106 has gradually decreased so that, at this time, the voltage drop across resistor 106 has been reduced to approximately 5 volts. This +5 volts at terminal 33 causes base 111 to be less positive than emitter 112 so that a current flows from emitter 112 to base 111 thereby rendering transistor 109 conductive. A current now flows from terminal 116 through diode 115 to emitter 112 of transistor 109 where the current divides. A current flows from emitter 112 to collector 110 where the current divides. A current $I_{21}$ flows from collector 110 through resistor 120 to terminal 121. No current now flows through diode 131. Current $I_{21}$ provides the voltage polarities shown across resistor 120. The value of the voltage potential at terminal 39 is greater than the value of the voltage potential at terminal 121 by the amount of the voltage drop across resistor 120 so that the voltage at terminal 39 is approximately +5 volts. A current $I_{22}$ flows from collector 110 of transistor 109 to terminal 39, to the left plate of capacitor 130, from the right plate of capacitor 130 through base 126 and emitter 127 of transistor 124 to ground. Due to the small value of impedance between base 126 and emitter 127, current $I_{22}$ rapidly charges capacitor 130 with the voltage polarities shown.

If, however, the amplitude of the voltage at terminal 20 of detector 21 immediately prior to time C (waveform U) is less than the threshold voltage of +6 volts, transistor 139 will continue to be conductive and terminal 22 is maintained at +6 volts. This +6 volt potential at terminal 22 is coupled through diode 119 to base 111 of transistor 109 so that transistor 109 remains nonconductive. Transistor 109 remains nonconductive even when transistor 94 is nonconductive due to the voltage at terminal 31. If transistor 109 remains nonconductive, no change in voltage occurs at terminal 39. Thus it has been shown that gate 38 produces a positive voltage pulse at terminal 39 only when a signal pulse applied to input terminals 11 and 12 has a greater than minimum signal amplitude and a greater than minimum time duration.

At time D (waveform T, FIG. 2) capacitor 80 in detector 26 starts to discharge because of the increase in voltage potential at terminal 27. A current $I_{24}$ flows from the right plate of capacitor 80 through base 77 to emitter 78 of transistor 74 to ground. Current $I_{24}$ causes transistor 74 to conduct heavily. Current $I_3$ from terminal 83 through resistor 82 again provides a large voltage drop across resistor 82 so that the voltage potential at base 77 of transistor 75 is near ground potential. This voltage potential at base 77 renders transistor 75 nonconductive. Current $I_4$ again flows from junction point 73 through base 96 to emitter 97 of transistor 94, through resistor 106 to ground as it did prior to time A. Current $I_4$ again renders transistor 94 conductive. Due to $I_5$ again flowing through transistor 94, the voltage drop across resistor 106 is again approximately 11 volts. The +11 volts at terminal 33 of detector 32 is coupled to base 111 of transistor 109 so that transistor 109 is again rendered nonconductive so that the voltage at terminal 39 decreases. A current flows from terminal 134 through resistor 136 to the right plate of capacitor 130, from the left plate of capacitor 130 through resistor 120 to terminal 121. The current through resistor 136 provides the voltage polarities shown across resistor 136. The voltage is less than the voltage potential at terminal 134 by the amount of the voltage drop across resistor 136 so that the voltage potential at base 126 of transistor 124 is negative. Transistor 124 is thus rendered nonconductive. No current now flows through resistor 133 so that the voltage at terminal 44 is approximately +6 volts as long as current $I_{26}$ flows. The values of resistors 136 and 120 and of capacitor 130 determine the duration of time that transistor 124 is nonconductive and thereby determine the duration of the pulse at terminal 44.

At time F (waveform Z) capacitor 130 has discharged so that transistor 124 is again rendered conductive. Capacitor 105 has discharged through transistor 94. All currents and voltage potentials in the circuit are as they were prior to time A.

At time H (waveform T) a noise voltage pulse is applied to terminal 27 of detector 26. All currents and voltage potentials in the circuit are as they were at time A. Current $I_5$ in the circuit of detector 32, flows from terminal 103 through diode 102 to the upper plate of capacitor 105, from the lower plate of capacitor 105 through resistor 106 to ground. As capacitor 105 charges, the voltage drop across capacitor 105 decreases and the voltage drop across resistor 106 decreases. Due to the short time duration of the noise pulse, the voltage potential at terminal 33 is always more than a +5 volts. Thus transistor 109 remains nonconductive and no voltage pulse is developed at terminals 39 and 44. Thus, it has been shown that noise pulses having less than a predetermined duration do not cause a signal pulse to be delivered at output terminal 44.

At time J (waveform T) a false signal shown as a slowly increasing voltage potential is applied to terminal 27 of detector 26. The time rate of change of the applied voltage is not large enough to cause an appreciable decrease in the amount of current $I_2$ flowing from junction point 73 through resistor 86, through base 77 to emitter 78 of transistor 74. Thus, current $I_3$ from terminal 83 through resistor 82 and collector 76 to emitter 78 of transistor 74 is not decreased appreciably. Transistor 75 remains nonconductive and no change occurs in voltages and currents in the circuits of detector 32, gate 38 and pulse stretcher 43. Thus, it has been shown that a slowly varying voltage at terminal 27 does not cause a signal pulse to be delivered at output terminal 44.

The minimum amplitude of signal which will be detected by detector 21 can be changed by changing the position of the arm of potentiometer 57. If the arm of potentiometer 57 is moved toward terminal 58, a more positive D.C. potential is applied to terminal 14 through resistors 60 and 61 and diodes 48 and 49. Thus, a signal pulse, which is superimposed on the D.C. potential requires less amplitude to render transistor 139 nonconductive and allows gate 38 to deliver a pulse at output terminal 39 when a pulse having at least a minimum slope and at least a minimum time duration is applied to input terminal 27 of detector 26.

In applications where amplitude of signal pulses is not critical, detector 21 can be omitted from the circuit by disconnecting the cathode of diode 119 from base 111 of transistor 109. A signal pulse having proper slope and a predetermined minimum time duration, applied to terminal 27 of detector 26, will cause the voltage drop across resistor 106 in detector 32 to decrease so that transistor 109 in gate 38 is rendered conductive. A pulse is developed by gate 38 (waveform Y).

Thus, the objects set forth herein are realized by the instant invention, wherein a novel arrangement of peak and slope detectors, a minimum duration detector, an amplitude detector, a gate, a pulse stretcher and rectifiers are employed to detect signal pulses, where each pulse has a predetermined minimum slope, minimum time duration and minimum amplitude.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. Apparatus for use with a source of electrical signals comprising: a rectifier; said rectifier being adapted to receive said signals and to deliver unidirectional pulses; a slope detector, said detector being coupled to said rectifier, said detector being adapted to receive said pulses and to deliver a first output signal when the slope of one of said pulses is greater than a predetermined value; a duration detector, said duration detector being coupled to said slope detector and responsive to said first output signal, said duration detector delivering a second signal representing the duration of said first output signal; an amplitude detector, said amplitude detector being coupled to said rectifier, said amplitude detector being adapted to receive said pulses and to deliver a third output signal when the amplitude of one of said pulses is greater than a predetermined value; a rectangular pulse producing means, said means being coupled to said duration detector, and said means being coupled to said amplitude detector and responsive to said second signal and to said third signal, said means delivering a first rectangular pulse when said second signal and said third signal both reach a predetermined value; and a pulse stretcher, said stretcher being coupled to said means and responsive to said first rectangular pulse, said stretcher delivering a second rectangular pulse having a predetermined minimum duration when one of said first rectangular pulses is produced.

2. Apparatus for use with a source of electrical signals comprising: a rectifier; said rectifier being adapted to receive said signals and to deliver unidirectional pulses; a slope detector, said detector being coupled to said rectifier, said detector being adapted to receive said pulses and to deliver a first output signal when the slope of one of said pulses is greater than a predetermined value; a duration detector, said duration detector being coupled to said slope detector and responsive to said first output signal, said duration detector delivering a second signal representing the duration of said first output signal; an amplitude detector, said amplitude detector being coupled to said rectifier, said amplitude detector being adapted to receive said pulses and to deliver a third output signal when the amplitude of one of said pulses is greater than a predetermined value; a coincidence gate, said gate being coupled to said duration detector, said gate being coupled to said amplitude detector, said gate being responsive to said second signal, and to said third signal, said gate delivering a first rectangular pulse when said second signal and said third signal both reach a predetermined value; and a pulse stretcher, said stretcher being coupled to said gate and responsive to said first rectangular pulse, said stretcher delivering a second rectangular pulse having a predetermned minimum duration when one of said first rectangular pulses is produced.

3. Apparatus for use with a source of electrical signals comprising: a rectifier; said rectifier being adapted to receive said signals and to deliver unidirectional pulses; a slope and peak detector, said detector being coupled to said rectifier, said detector being adapted to receive said pulses and to deliver a first output signal when the slope of one of said pulses is greater than a predetermined value, the value of said first output signal changing when one of said pulses reaches a peak value; a duration detector, said duration detector being coupled to said slope detector and responsive to said first output signal, said duration detector delivering a second signal representing the duration of said first output signal; an amplitude detector, said amplitude detector being coupled to said rectifier, said amplitude detector being adapted to receive said pulses and to deliver a third output signal when the amplitude of one of said pulses is greater than a predetermined value; a rectangular pulse producing means, said means being coupled to said duration detector, and said means being coupled to said amplitude detector and responsive to said second signal and to said third output signal, said means delivering a first rectangular pulse when said second signal and said third output signal both reach a predetermined value; and a pulse stretcher, said stretcher being coupled to said means and responsive to said first rectangular pulse, said stretcher delivering a second rectangular pulse having a predetermined minimum duration when one of said first rectangular pulses is produced.

4. A device for use with a source of unidirectional electrical signals comprising: first and second transistors each having a base, a collector and an emitter, means for connecting said collector of said first transistor to a potential source, means for connecting said collector of said second transistor to a potential source; a signal input terminal; said terminal being adapted to receive said signals; a capacitor; said capacitor being connected between said terminal and said base of said first transistor; said emitter of said first transistor being connected to a potential source; first, second and third resistors, said first resistor being connected between said base of said first transistor and a potential source; said second resistor being connected between said emitter of said second transistor and a potential source; said third resistor being connected between said collector of said second transistor and said base of said first transistor; said base of said second transistor being connected to said collector of said first transistor; an output terminal; said output terminal being connected to said collector of said second transistor; and a diode having a cathode and an anode; said cathode of said diode being connected to said base of said first transistor and said anode of said diode being connected to said emitter of said second transistor to provide feedback from said emitter of said second transistor to said base of said first transistor to maintain said first transistor in a conductive condition while a signal from said source is increasing in amplitude, whereby said device produces an abrupt change in voltage level at said output terminal as said signal increases to a peak voltage value.

5. A device for use with a source of unidirectional electrical signals comprising: first and second transistors each having a base, a collector and an emitter; first and second reference potentials; said collectors of said first and said second transistor each being resistively coupled to said first potential; a signal input terminal; said terminal being adapted to receive said signals; a capacitor; said capacitor being connected between said terminal and said base of said first transistor; said emitter of said first transistor being connected to said second potential; first, second and third resistors; said first resistor being connected between said base of said first transistor and said second potential; said second resistor being connected between said emitter of said second transistor and said second potential; said third resistor being connected between said collector of said second transistor and said base of said first transistor; said base of said second transistor being connected to said collector of said first transistor; an output terminal; said output terminal being connected to said collector of said second transistor; and a diode having a cathode and an anode; said cathode of said diode being connected to said base of said first transistor and said anode of said diode being connected to said emitter of said second transistor to provide feedback from said emitter of said second transistor to said base of said first transistor to maintain said first transistor in a conductive condition while a signal from said source is increasing in amplitude, whereby said device produces an abrupt change in voltage level at said output terminal as said signal increases to a peak voltage value.

6. An apparatus for use with a source of unidirectional electrical signals comprising: first, second and third transistors each having a base, a collector and an emitter; first, second and third reference potentials; said collectors of said first and said second transistors each being resistively coupled to said first potential; a signal input terminal, said terminal being adapted to receive said signals; first and second capacitors; said first capacitor being connected between said terminal and said base of said first transistor; said emitter of said first transistor being connected to said second potential; first, second, third and fourth resistors; said first resistor being connected between said base of said first transistor and said second potential; said second resistor being connected between said emitter of said second transistor and said second potential; said third resistor being connected between said collector of said second transistor and said base of said first transistor; first, second and third diodes; said first diode being connected between said base of said first transistor and said emitter of said second transistor; said base of said third transistor being connected to said collector of said second transistor; said second diode being connected between said base of said third transistor and said third potential; said third diode being connected between said collector of said third transistor and said first potential; said second capacitor being connected between said collector and said emitter of said third transistor; said fourth resistor being connected between said emitter of said third transistor and said second potential; and an output terminal, said output terminal being connected to said emitter of said third transistor.

7. An apparatus for use with a source of unidirectional electrical signals comprising: first, second and third transistors each having a base, a collector and an emitter; first, second and third reference potentials; said collectors of said first and said second transistors each being resistively coupled to said first potential; a signal input terminal, said terminal being adapted to receive said signals; first and second capacitors; said first capacitor being connected between said terminal and said base of said first transistor; said emitter of said first transistor being connected to said second potential; first, second, third and fourth resistors; said first resistor being connected between said base of said first transistor and said second potential; said second resistor being connected between said emitter of said second transistor and said second potential; said third resistor being connected between said collector of said second transistor and said base of said first transistor; first and second diodes; said first diode being connected between said base of said first transistor and said emitter of said second transistor; said base of said first transistor being connected to said collector of said second transistor; said base of said third transistor being connected to said collector of said second transistor; said second diode being connected between said base of said third transistor and said third potential; said collector of said third transistor being connected to said first potential; said second capacitor being connected between said collector and said emitter of said third transistor; said fourth resistor being connected between said emitter of said third transistor and said second potential; and an output terminal, said output terminal being connected to said emitter of said third transistor.

References Cited

UNITED STATES PATENTS

| | | | |
|---|---|---|---|
| 2,434,937 | 1/1948 | Labin et al. | 328—114 |
| 2,489,297 | 11/1949 | Labin et al. | 328—108 |
| 2,828,450 | 3/1958 | Pinckaers | 330—26 |
| 2,861,258 | 11/1958 | Walsh et al. | 307—88 |
| 2,935,626 | 5/1960 | Mac Sorley | 307—88 |
| 2,952,811 | 9/1960 | Carr | 328—149 |

FOREIGN PATENTS

| | | |
|---|---|---|
| 605,823 | 9/1960 | Canada. |

ARTHUR GAUSS, *Primary Examiner.*

B. P. DAVIS, *Assistant Examiner.*

U.S. Cl. X.R.

307—234, 235; 328—110, 114, 115